Dec. 20, 1966     H. L. McCLELLAND     3,292,897

HIGH PRESSURE RELEASE VALVE

Filed Sept. 30, 1963

INVENTOR.
HOWARD L. McCLELLAND
BY
*William N. Antonis*
ATTORNEY

3,292,897
HIGH PRESSURE RELEASE VALVE
Howard Lawrence McClelland, Mishawaka, Ind., assignor to The Bendix Corporation, Mishawaka, Ind., a corporation of Delaware
Filed Sept. 30, 1963, Ser. No. 312,380
1 Claim. (Cl. 251—175)

This invention relates to valves and more particularly to a novel high pressure release valve.

Oftentimes in various aircraft and missile applications it is necessary that a high pressure hydraulic or pneumatic source be sealed for a given interval and that such seal be rendered inoperative at a predetermined moment, said moment being determined by an independent variable such as time, acceleration, pressure, etc.

Accordingly, it is an object of this invention to provide a novel high pressure release valve which will function in the aforementioned manner wherein the sealing means utilized has no practical limits on either the pressure to be sealed or the size of the orifice in which sealing takes place.

Another object of this invention is to provide a high pressure release valve which can effectively control flows through relatively small passages.

A further object of this invention is to provide a high pressure release valve which includes a bore therein having a porous wall portion and a non-porous wall portion, a plunger located in said bore for preventing or permitting flow from a high pressure source to a low pressure source via the porous wall portion of said bore depending on the position of the plunger, and a resilient deformable spherical ball located in said bore which in the closed position of the valve is forced into contact with and deformed against the end of the plunger by the pressure from the high pressure source acting thereon to thereby seal the clearance between the plunger and the non-porous wall portion of the bore.

The above and other objects and features of the invention will be apparent from the following description of the device taken in connection with the accompanying drawing which forms a part of this specification and in which.

Figure 2:
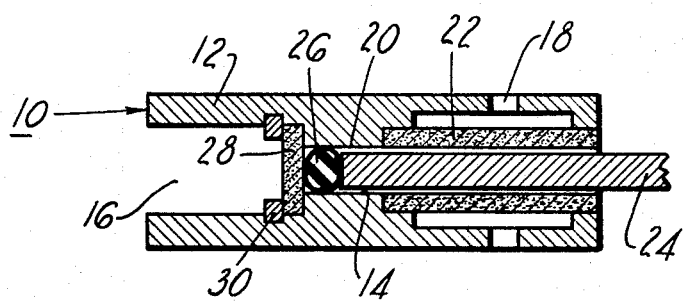
FIGURE 2 is a sectional view of the valve in a closed position.
Figure 3:
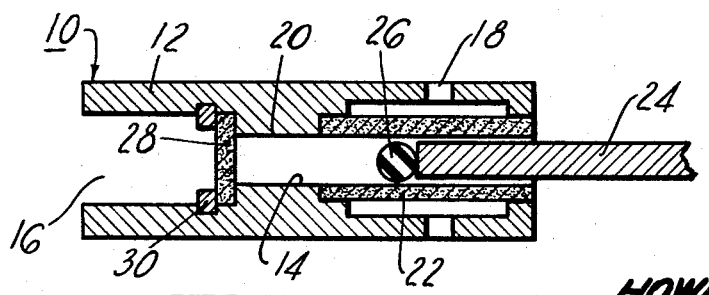
FIGURE 3 is a sectional view of the valve in an open position.

Referring to FIGURES 2 and 3, it will be seen that the numeral 10 designates a high pressure valve which, under predetermined conditions, will prevent or permit flow through a fluid circuit. More particularly the valve 10 includes a housing 12 having a bore 14 therein, a high pressure passage 16 and a low pressure passage 18. It should be noted that the bore consists of a non-porous wall portion 20 and a porous wall portion 22. The porous wall portion is a sleeve which may be made from any high density, finely finished porous material such as sintered bronze, sintered wire wound tube, etc. Located within the bore is a plunger 24, a resilient deformable ball 26, and a suitable porous disc 28 which is retained in the bore by a retainer 30. The ball 26 may be formed from molded rubber or other suitable resilient material and should be of a diameter consistent with the diameter of the bore 14. Since the ball 26 is located between the high pressure passage 16 and the plunger 24, when the plunger is in the position shown in FIGURE 2, the ball will be forced into contact with and deformed against the end of the plunger by the high pressure acting thereon. As shown in the drawing, the ball will be deformed to such an extent that it will seal the clearance between the plunger and the non-porous wall portion 20 of the bore 14 and thereby prevent flow between the high pressure passage 16 and low pressure passage 18. As the plunger 24 is moved to the position shown in FIGURE 3, the pressure differential acting on the ball 26 will cause it to move with the plunger. When the ball reaches the porous sleeve 22, it will be rendered inoperative as a seal and free communication between passages 16 and 18, via porous sleeve 22, will be permitted. Instead of relying solely on the high pressure to deform the resilient ball 26, if deformation at lower pressures is also desired, the device may be designed so that in the closed position the ball will be mechanically squeezed between the porous disc 28 and the plunger 14.

Figure 1:
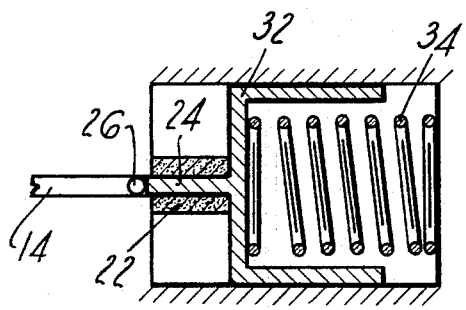
FIGURE 1 is a schematic showing of a device utilizing the invention.

In the schematic showing of FIGURE 1, it will be seen that a piston 32 is operatively connected to the plunger 24 and is urged towards the closed position by a spring 34. Thus, it may be seen that movement of plunger 24 can be caused by a predetermined pressure differential acting across the piston, if such a control is desired. On the other hand, by attaching a G weight to the plunger or piston, the plunger could be caused to move upon the occurrence of a predetermined acceleration force. Another possible method of causing movement of the plunger would be to use a magnetic force on the plunger or piston which is controlled by a solenoid.

The several practical advantages which flow from the invention are believed to be obvious from the above, and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claim.

Having thus described the various features of the invention, what I claim as new and desire to secure by Letters Patent is:

A high pressure pneumatic release valve comprising a housing having a constant diameter bore therein, said bore having an axially extending porous wall portion formed by a high density finely finished sintered porous sleeve-like member and a non-porous wall portion, high pressure passage means and low pressure passage means communicating with said bore, movable plunger means located in said bore, said plunger means having a first position wherein the end thereof is located in the non-porous wall portion of said bore to prevent communication between said high and low pressure passage means and a second position wherein the end thereof is located in the porous wall portion of said bore to permit communication therebetween via said porous wall portion, a porous disc type retaining element located in and extending across said bore, a resilient deformable spherical member located in said bore and confined between said porous retaining element and said plunger means when said plunger means is in said first position, said resilient member being forced into contact with and deformed against the end of said plunger means by the high pressure acting thereon to thereby seal the clearance between the plunger means and the non-porous wall portion of said bore as long as said plunger means remains in said first position, and means for causing movement of said plunger means to said second position, said resilient means being rendered inoperative as a seal after being forced by the high pressure acting thereagainst to follow said plunger means to said second position.

References Cited by the Examiner
UNITED STATES PATENTS

| | | |
|---|---|---|
| 60,082 | 11/1866 | Street. |
| 1,488,008 | 3/1924 | Jones. |
| 2,664,266 | 12/1953 | Johnson _____ 251—191 X |
| 2,719,537 | 10/1955 | Gildersleeve _____ 137—251 |
| 2,967,544 | 1/1961 | Pearsall. |

ALAN COHAN, *Primary Examiner.*

CLARENCE R. GORDON, WILLIAM F. O'DEA,
*Examiners.*